United States Patent
Petrosky et al.

(10) Patent No.: US 11,460,304 B2
(45) Date of Patent: Oct. 4, 2022

(54) METHOD OF LOCATING A REMOTELY OPERATED VEHICLE WITHIN A WORKSPACE AND REMOTE INSPECTION SYSTEM EMPLOYING SUCH METHOD

(71) Applicant: WESTINGHOUSE ELECTRIC COMPANY LLC, Cranberry Township, PA (US)

(72) Inventors: Lyman J. Petrosky, Latrobe, PA (US); Martin Bolander, Sundbyberg (SE)

(73) Assignee: Westinghouse Electric Company LLC, Cranberry Township, PA (US)

( * ) Notice: Subject to any disclaimer, the term of this patent is extended or adjusted under 35 U.S.C. 154(b) by 172 days.

(21) Appl. No.: 16/045,801

(22) Filed: Jul. 26, 2018

(65) Prior Publication Data

US 2019/0033080 A1    Jan. 31, 2019

Related U.S. Application Data

(60) Provisional application No. 62/537,571, filed on Jul. 27, 2017.

(51) Int. Cl.
*G01C 21/20* (2006.01)
*G05D 1/00* (2006.01)
(Continued)

(52) U.S. Cl.
CPC ......... *G01C 21/206* (2013.01); *G01C 21/005* (2013.01); *G01C 21/203* (2013.01);
(Continued)

(58) Field of Classification Search
CPC .. G01C 21/206; G01C 21/203; G01C 21/005; G06T 7/73; G06T 7/75; G05D 1/0033; G05D 1/0692
See application file for complete search history.

(56) References Cited

U.S. PATENT DOCUMENTS 5,050,112 A * 9/1991 Hedglen ............... G01B 21/04
                                                           33/548
6,146,390 A * 11/2000 Heilbrun ............... A61B 5/06
                                                           606/130
(Continued)

FOREIGN PATENT DOCUMENTS

CH          703740 A2      3/2012
JP       2002065641 A      3/2002
(Continued)

OTHER PUBLICATIONS

International Search Report and Written Opinion for International PCT Application No. PCT/US2018/043814, dated Nov. 7, 2018: 1-10 Pages.

(Continued)

*Primary Examiner* — Hunter B Lonsberry
*Assistant Examiner* — Daniel L Greene
(74) *Attorney, Agent, or Firm* — K&L Gates LLP

(57) ABSTRACT

A method of locating a remotely operated vehicle within a workspace includes the steps of: receiving a video feed of the workspace from a video camera; processing the video feed to identify landmarks and features of known physical structures in or near the workspace; determining a correlation between the features and landmarks and known physical structures; calibrating the video feed from the camera to the known physical structures using the correlation; determining the location in the calibrated video feed of a number of fiducial markers on the remotely operated vehicle; and determining the position of the remotely operated vehicle within the workspace using the location of the number of fiducial markers in the calibrated video feed.

18 Claims, 3 Drawing Sheets

(51) Int. Cl.
    *G06T 7/73*         (2017.01)
    *G01C 21/00*     (2006.01)
    *G05D 1/06*      (2006.01)

(52) U.S. Cl.
    CPC ......... *G05D 1/0033* (2013.01); *G05D 1/0692* (2013.01); *G06T 7/73* (2017.01); *G06T 7/75* (2017.01); *G06T 2207/10016* (2013.01); *G06T 2207/10024* (2013.01); *G06T 2207/30208* (2013.01); *G06T 2207/30244* (2013.01); *G06T 2207/30252* (2013.01)

(56) References Cited

U.S. PATENT DOCUMENTS

| | | | |
|---|---|---|---|
| 6,594,600 | B1 | 7/2003 | Arnoul et al. |
| 8,757,084 | B2* | 6/2014 | Condit ................ G21C 17/013 |
| | | | 114/313 |
| 9,251,721 | B2* | 2/2016 | Lampotang .......... G09B 23/285 |
| 9,690,454 | B2* | 6/2017 | Rezvan ................ G06F 3/0484 |
| 9,717,461 | B2* | 8/2017 | Yu ........................ G01R 33/283 |
| 10,346,797 | B2* | 7/2019 | Jacobus ............... G05D 1/0246 |
| 2002/0103617 | A1 | 8/2002 | Uchiyama et al. |
| 2010/0188510 | A1 | 7/2010 | Yoo et al. |
| 2012/0185094 | A1* | 7/2012 | Rosenstein .......... G05D 1/0251 |
| | | | 700/259 |
| 2012/0197519 | A1 | 8/2012 | Richardson |
| 2013/0335111 | A1* | 12/2013 | Hawkins ................ G01R 1/067 |
| | | | 324/755.01 |
| 2014/0376768 | A1* | 12/2014 | Troy .................... G06K 9/3241 |
| | | | 382/103 |
| 2016/0016312 | A1* | 1/2016 | Lawrence, III .... G01N 21/9515 |
| | | | 700/98 |
| 2016/0182903 | A1 | 6/2016 | Grundhofer |
| 2016/0227193 | A1* | 8/2016 | Osterwood ........... B25J 9/1697 |
| 2016/0324580 | A1* | 11/2016 | Esterberg ............... A61B 5/055 |
| 2016/0378109 | A1 | 12/2016 | Raffa et al. |
| 2020/0068125 | A1* | 2/2020 | Michael ............... G21C 17/013 |

FOREIGN PATENT DOCUMENTS

| | | |
|---|---|---|
| JP | 2008209189 A | 9/2008 |
| JP | 2016177640 A | 10/2016 |
| WO | 2008000692 A2 | 1/2008 |
| WO | 2008111692 A1 | 9/2008 |
| WO | 2019023416 A1 | 1/2019 |

OTHER PUBLICATIONS

International Preliminary Report on Patentability for International PCT Application No. PCT/US2018/043814, dated Jan. 28, 2022: 1-8 Pages.

Supplementary European Search Report for Corresponding European Patent Application No. EP1883776.1, dated Mar. 12, 2021: 1-7 Pages.

Bosch et al., Close-Range Tracking of Underwater Vehicles Using Light Beacons, Sensors (Mar. 25, 2016), 16 (429):1-26 Pages.

* cited by examiner

METHOD OF LOCATING A REMOTELY OPERATED VEHICLE WITHIN A WORKSPACE AND REMOTE INSPECTION SYSTEM EMPLOYING SUCH METHOD

CROSS-REFERENCE TO RELATED APPLICATIONS

This patent application claims the priority benefit under 35 U.S.C. § 119(e) of U.S. Provisional Application No. 62/537,571 filed on Jul. 27, 2017, the contents of which are herein incorporated by reference.

FIELD OF THE INVENTION

The present invention is directed to methods of locating a remotely operated vehicle within a workspace. The present invention is also directed to remote inspection systems which employ such methods.

BACKGROUND

Remotely operated vehicles (ROVs), are commonly employed for performing various tasks (e.g., repairs, inspections, etc.) in areas and/or environments which are not readily accessible or are inaccessible (for various reasons) by humans. An example of such use/environment is in inspecting regions within a nuclear reactor vessel which would not only be deadly to a human inspector, but would also destroy many modern electrical components instantly or in a very short period of time.

In order to carry out a safe and thorough inspection of a nuclear reactor vessel, the location and movement of an ROV used in such environment must be monitored. Presently there are no low-cost solutions that adequately allow for determining and tracking the position of an ROV in such an environment or in other inhospitable environments (e.g., outer space, deep sea).

There are many locating methods available that utilize various sensors located on the ROV, but the radiation present in nuclear reactors renders such methods inapplicable. The few methods that do not require sensors on the ROV typically require the use of lasers or other costly equipment. Accordingly, there exists room for improvement in methods of locating a remotely operated vehicle within a workspace and for remote inspection systems employing such methods.

SUMMARY OF THE INVENTION

In accordance with an embodiment of the invention, a method of locating a remotely operated vehicle within a three-dimensional workspace is provided. The method comprises: receiving a video feed of the workspace from a video camera; processing the video feed to identify landmarks and features of known physical structures in or near the workspace; determining a correlation between the features and landmarks and known physical structures; calibrating the video feed from the camera to the known physical structures using the correlation; determining the location in the calibrated video feed of a number of fiducial markers which are positioned on the remotely operated vehicle; and determining the three-dimensional position of the remotely operated vehicle within the workspace using the location of the number of fiducial markers in the calibrated video feed.

Determining a correlation between the landmarks and features and known physical structures may comprise constructing a three-dimensional reference framework based on previously known dimensional information of the known physical structures.

Determining the location in the calibrated video feed of a number of fiducial markers on the remotely operated vehicle may comprise determining the location of at least three distinct fiducial markers.

Determining the location of at least three distinct fiducial markers may comprise determining the location of at least three spherical elements.

Determining the location in the calibrated video feed of a number of fiducial markers on the remotely operated vehicle may comprise determining the location of at least two distinct fiducial markers.

In accordance with another embodiment of the invention, a remote inspection system is provided. The remote inspection system comprises: a remotely operated vehicle operable within a three-dimensional workspace, the remotely operated vehicle having a number of fiducial markers positioned thereon; a video camera positioned at or about a boundary of the workspace, the video camera positioned and structured to capture images of landmarks and features located in or near the workspace; an electronic storage medium having dimensional details of the landmarks and the features stored therein; and a processing device in electrical communication with both the camera and the electronic storage medium, the processing device programmed to: receive images of the workspace in a video feed from the video camera, process the video feed to identify the features and landmarks, determine a correlation between the features and landmarks and known physical structures, calibrate the video feed from the camera to the known physical structures using the correlation, determine the location in the calibrated video feed of a number of fiducial markers on the remotely operated vehicle, and determine the three-dimensional position of the remotely operated vehicle within the workspace using the location of the number of fiducial markers in the calibrated video feed.

The number of fiducial markers may comprise a plurality of spherical elements. The spherical elements may be of a high contrast color.

The workspace may comprises an interior of a nuclear reactor vessel.

The video camera may be positioned at or about an upper portion of the workspace.

The electronic storage medium and the processing device may comprise elements of a computing device. The computing device may comprise a desktop or laptop computer. The computing device may comprise a handheld computing device.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
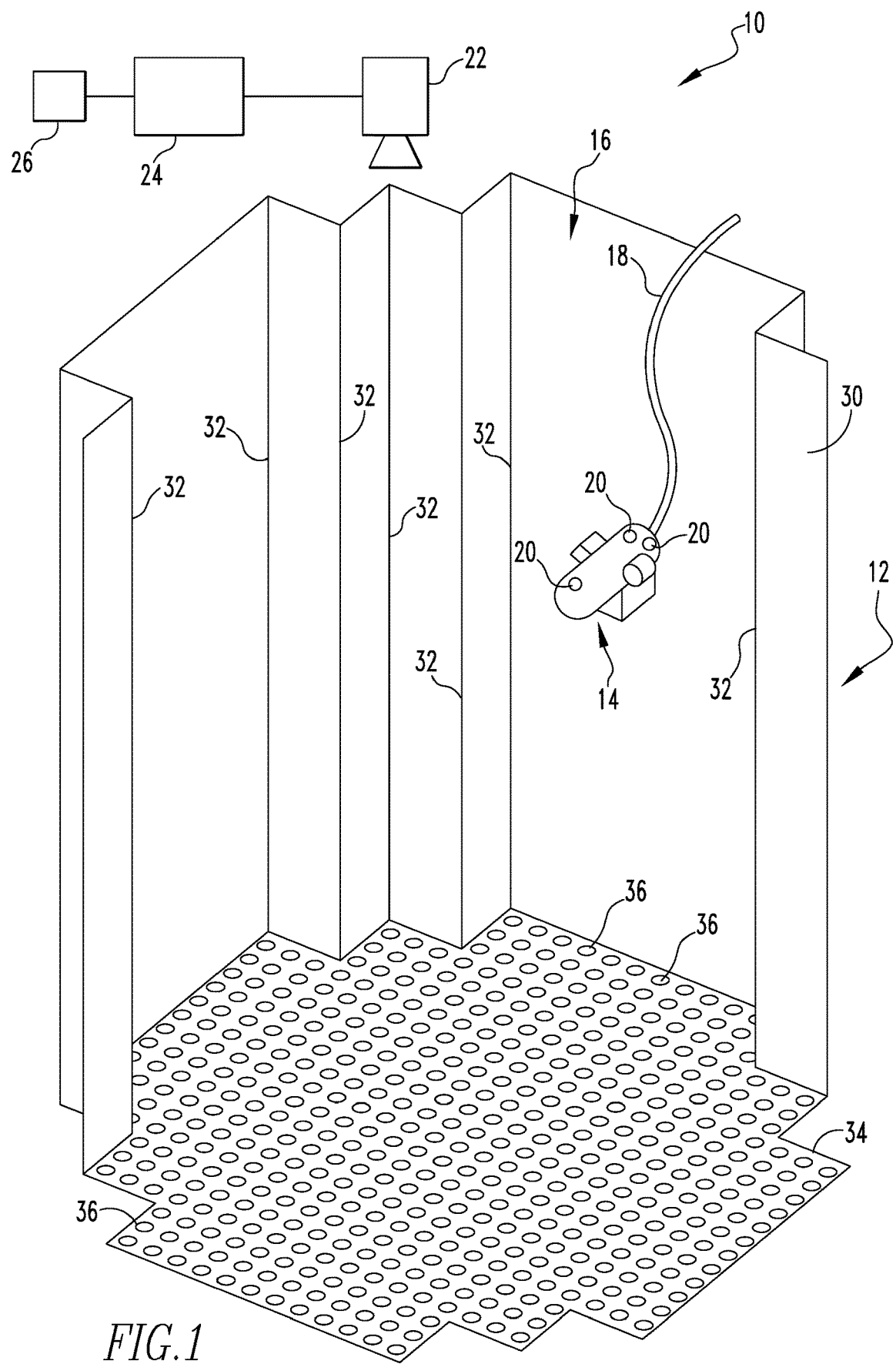
FIG. 1 shows a schematic view of a remote inspection system in accordance with an example embodiment of the present invention.

The present invention will now be described more fully hereinafter with reference to the accompanying drawings, in which examples of the invention are shown. The invention may, however, be embodied in many different forms and should not be construed as limited to the examples set forth herein. Rather, these examples are provided so that this disclosure will be thorough and complete, and will fully convey the scope of the invention to those skilled in the art. Like numbers refer to like elements throughout.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein. As used herein, the term "number" shall mean one or an integer greater than one (i.e., a plurality).

Referring to FIG. 1, a schematic view of a remote inspection system 10 in accordance with an example embodiment of the present invention is shown positioned in a water-filled interior of a nuclear reactor vessel 12. Remote inspection system 10 includes a remotely operated vehicle (ROV) 14 which is operable within a three-dimensional workspace (e.g., the water-filled interior of reactor vessel 12) as shown generally at 16. As used herein, "workspace" shall be used to refer to the three-dimensional space in which an ROV may be operated. In the example embodiment shown in FIG. 1, ROV 14 is a remotely operated submersible vehicle which is tethered to a remote control system (not shown) via an umbilical 18, which includes a number of communications cables for the transmission of data/control signals to ROV 14 and data/video images from ROV 14. It is to be appreciated that other ROVs (e.g., without limitation flying drones), wired or wirelessly operable, may be employed without varying from the scope of the present invention.

ROV 14 includes a number of fiducial markers 20 positioned thereon (three of which are illustrated in the embodiment of FIG. 1). The position and relative spacing (e.g., $d_1$ and $d_2$ of FIG. 2) of fiducial markers 20 is predetermined such that fiducial markers 20 may be used to determine one or more of the orientation and/or angle of ROV 14. In an example embodiment of the present invention, spherical elements, approximately the size of a golf ball have been utilized. It is to be appreciated that such spherical objects remain the shape/size regardless of viewing angle (when distance is kept constant). In order to increase visibility of markers 20, such markers are preferably of a high contrast color (e.g., without limitation, fluorescent orange). It is also to be appreciated that other quantities and or shapes (e.g., without limitation, disk, partial sphere) of fiducial markers may be employed without varying from the scope of the present invention.

Figure 2:
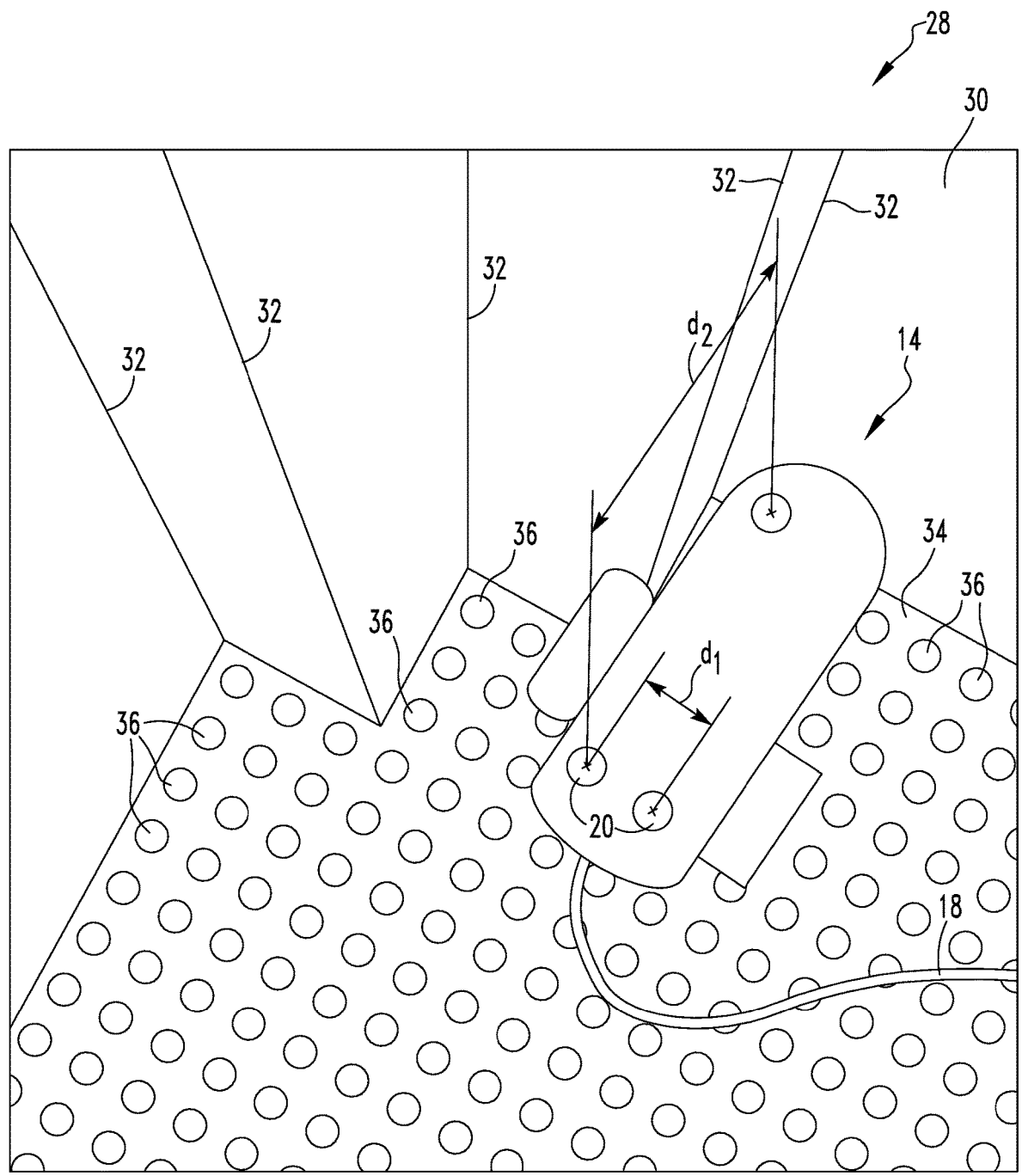
FIG. 2 shows an example screenshot in accordance with an example embodiment of the present invention of a video feed from a camera of a remote inspection system such as shown in FIG. 1.

Continuing to refer to FIG. 1, remote inspection system 10 further includes a video camera 22 in electrical communication with a processing device 24 and a suitable electronic storage medium 26 which may be integral with, or separate from, processing device 24. Video camera 22 is positioned at or about a boundary of workspace 16 and is positioned and structured to provide a video feed, via wired or wireless means, of images of workspace 16, including ROV 14 disposed therein along with landmarks (e.g., wall 30, floor 34) and features of such landmarks (e.g., vertical joints 32 of wall 30 and apertures 36 of floor 34), located in or near workspace 16. FIG. 2 shows an example of an image 28 from a video feed captured by camera 22 in accordance of an example embodiment of the present invention. In the example embodiment of FIG. 1, video camera 22 is positioned at or about an upper portion of workspace 16 and is structured to be able to pan and zoom upon request, however, it is to be appreciated that other cameras with other functionality, and positioning may be employed without varying from the scope of the present invention.

Processing device 24 may be any suitable programmable analog and/or digital device (including an associated memory part or portion) that can store, retrieve, execute and process data (e.g., software routines and/or information used by such routines), including, without limitation, a computer, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus.

Electronic storage medium 26 can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory. Electronic storage medium 26 includes dimensional details of the landmarks and the features stored therein (e.g., distance between vertical joints 32, diameter of apertures 36, spacing between apertures 36, etc.). Electronic storage medium 26 may be integral with processing unit 24. In example embodiments of the present invention, processing device 24 and electronic storage medium 26 comprise elements of a computing device such as, without limitation, a desktop or laptop computer, or a handheld computing device (e.g., without limitation a tablet computer or a smartphone).

Figure 3:
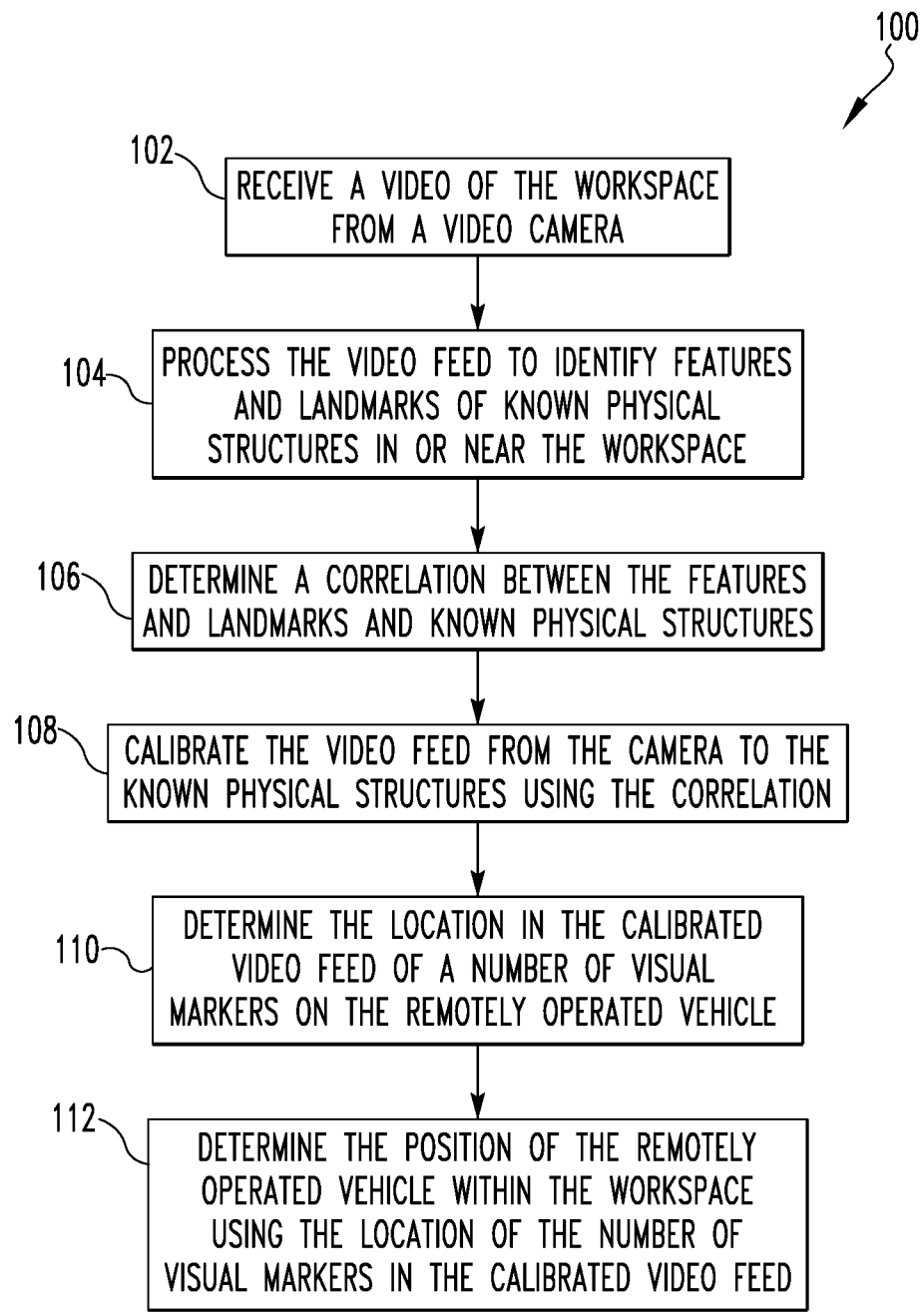
FIG. 3 shows the general steps of a method of locating a remotely operated vehicle within a workspace in accordance with an example embodiment of the present invention.

Having thus described the basic elements of a remote inspection system 10 in accordance with an example embodiment of the present invention, a method 100 (e.g., which is carried out by processing device 24) of determining the three-dimensional position of ROV 14 within workspace 16 will now be described in conjunction with FIG. 3. Method 100 begins at step 102 where a video feed of workspace 16 is received from video camera 22. Next, as shown in step 104, the video feed is processed to identify landmarks 30, 34 and features 32, 36 thereof in or near workspace 16.

After the landmarks and features in or near the workspace have been identified in step 104, dimensional data of such known physical structures which was stored in advance of such time in electronic storage medium 26 is used to determine a correlation between the landmarks and features identified in the video feed and known physical structures, such as shown in step 106. In an example embodiment of the present invention such correlation is determined by constructing a three-dimensional reference framework based on the previously known dimensional information of the known physical structures and how those structures appear in the video feed. The correlation is then used in step 108 to calibrate the video feed from video camera 22 to the known physical structures.

After workspace 16 has been recognized/generally three-dimensionally mapped in steps 102-108, the three-dimensional location in the calibrated video feed of the number of fiducial markers 20 on ROV 14, is determined in step 110. Finally, in step 112, the position of ROV 14 within workspace 16, as well as the orientation/tilt thereof, is determined using the location of the number of fiducial markers 20 in the calibrated video feed. Generally, determination of the ROV's x,y,z position and yaw is desired to adequately identify working position. These parameters can be uniquely determined with as few as 3 markers being visible simultaneously. Alternatively, if prior state information can be used to designate ROV's "front" end, only two markers visible may be adequate.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A method of locating a remotely operated vehicle within a workspace, wherein the workspace comprises an interior of a nuclear reactor vessel, the method comprising:
   receiving a video feed of the workspace from a video camera;
   processing the video feed to identify landmarks and features thereof of known physical structures in or near the workspace;
   determining a correlation between the landmarks and the features identified in the video feed and known physical structures, wherein determining a correlation comprises constructing a three-dimensional reference framework of the workspace based on previously known dimensional information of the known physical structures;
   calibrating the video feed from the video camera to the known physical structures using the correlation;
   determining the location in the calibrated video feed of a number of fiducial markers positioned on the remotely operated vehicle; and
   determining the position of the remotely operated vehicle within the workspace using the location of the number of fiducial markers in the calibrated video feed.

2. The method of claim 1, wherein determining the location in the calibrated video feed of a number of fiducial markers positioned on the remotely operated vehicle comprises determining the location of at least two distinct fiducial markers.

3. The method of claim 1, further comprising submerging the remotely operated vehicle in a water-filled interior of the nuclear reactor vessel.

4. The method of claim 1, wherein the remotely operated vehicle is coupled to a control system via an umbilical, wherein the umbilical comprises cables configured to transmit data between the control system and the remotely operated vehicle.

5. The method of claim 1, wherein the remotely operated vehicle is wirelessly coupled to a control system.

6. The method of claim 1, wherein determining the location in the calibrated video feed of a number of fiducial markers positioned on the remotely operated vehicle comprises determining the location of at least three distinct fiducial markers.

7. The method of claim 3, wherein determining the location of at least three distinct fiducial markers comprises determining the location of at least three spherical elements.

8. The method of claim 1, wherein the landmarks comprise a wall of the nuclear reactor vessel.

9. The method of claim 8, wherein the features of the landmarks comprise a vertical joint of the wall.

10. The method of claim 1, wherein the landmarks comprise a floor of the nuclear reactor vessel.

11. The method of claim 10, wherein the features of the landmarks comprise an aperture of the floor.

12. A remote inspection system comprising:
   a remotely operated vehicle operable within a three dimensional workspace, wherein the workspace comprises an interior of a nuclear reactor vessel, the remotely operated vehicle having a number of fiducial markers positioned thereon;
   a video camera positioned at or about a boundary of the workspace, the video camera positioned and structured to capture images of landmarks and features located in or near the workspace;
   an electronic storage medium having dimensional details of the landmarks and the features stored therein; and
   a processing device in electrical communication with both the video camera and the electronic storage medium, the processing device programmed to:
   receive images of the workspace in a video feed from the video camera,
   process the video feed to identify the features and landmarks,
   determine a correlation between the landmarks and the features identified in the video feed and known physical structures, wherein determining a correlation comprises constructing a three-dimensional reference framework of the workspace based on the dimensional details stored in the electronic storage medium, calibrate the video feed from the video camera to the known physical structures using the correlation, determine the location in the calibrated video feed of the number of fiducial markers positioned on the remotely operated vehicle, and determine the position of the remotely operated vehicle within the workspace using the location of the number of fiducial markers in the calibrated video feed.

13. The remote inspection system of claim 12, wherein the video camera is positioned at or about an upper portion of the workspace.

14. The remote inspection system of claim 5, wherein the number of fiducial markers comprises a plurality of spherical elements.

15. The remote inspection system of claim 14, wherein the spherical elements are of a high contrast color.

16. The remote inspection system of claim 12, wherein the electronic storage medium and the processing device comprise elements of a computing device.

17. The remote inspection system of claim 16, wherein the computing device comprises a desktop or laptop computer.

18. The remote inspection system of claim 16, wherein the computing device comprises a handheld computing device.

* * * * *